(12) United States Patent
Mon et al.

(10) Patent No.: US 8,645,231 B2
(45) Date of Patent: Feb. 4, 2014

(54) PRIVATE SECTOR COIN CONSORTIUM

(75) Inventors: Felix Mon, Jacksonville, FL (US); Wallace Webster, II, Lynnwood, WA (US); Janet Sloan-Mcgonagle, Boston, MA (US); Bernadine Waite, Henderson, NV (US)

(73) Assignee: Bank of America Corporation, Charlotte, NC (US)

( * ) Notice: Subject to any disclaimer, the term of this patent is extended or adjusted under 35 U.S.C. 154(b) by 221 days.

(21) Appl. No.: 12/194,662

(22) Filed: Aug. 20, 2008

(65) Prior Publication Data

US 2009/0313146 A1 Dec. 17, 2009

Related U.S. Application Data

(60) Provisional application No. 61/061,188, filed on Jun. 13, 2008.

(51) Int. Cl.
*G06Q 10/00* (2012.01)
(52) U.S. Cl.
USPC .......................................................... 705/28

(58) Field of Classification Search
USPC ........................................................... 705/28
See application file for complete search history.

(56) References Cited

U.S. PATENT DOCUMENTS

| | | | | |
|---|---|---|---|---|
| 6,109,522 | A * | 8/2000 | Force et al. .................... | 235/379 |
| 2003/0135440 | A1 * | 7/2003 | Senga .............................. | 705/37 |
| 2005/0258235 | A1 * | 11/2005 | Silverbrook et al. .......... | 235/379 |
| 2008/0189212 | A1 * | 8/2008 | Kulakowski et al. ........... | 705/50 |
| 2009/0138383 | A1 * | 5/2009 | Alba et al. ...................... | 705/28 |

* cited by examiner

*Primary Examiner* — Rajesh Khattar
(74) *Attorney, Agent, or Firm* — Weiss & Arons LLP; Michael A. Springs, Esq.

(57) ABSTRACT

Apparatus and methods for distributing coins in a coin distribution system. Coins may be distributed among members of a coin consortium. Coins may be shipped from a first coin consortium member to a second coin consortium member based on a requirement to adjust a first coin inventory of the first consortium member and a second coin inventory of the second consortium member, respectively. Neither the first consortium member nor the second consortium member is the U.S. Federal Reserve Branch. Coins may be shipped from the second coin consortium member to the first coin consortium member based on a second requirement to adjust the first and second coin inventories.

16 Claims, 5 Drawing Sheets

PRIVATE SECTOR COIN CONSORTIUM

CROSS-REFERENCE TO RELATED APPLICATION

This is a nonprovisional application of U.S. Application No. 61/061,188, filed on Jun. 13, 2008, which is hereby incorporated by reference herein in its entirety.

FIELD OF TECHNOLOGY

Aspects of the disclosure relate to the recirculation and distribution of coinage in the banking system.

BACKGROUND

The current supply chain for U.S. coinage may be viewed as follows. The United States Treasury, acting as "producer," mints new coins. The Treasury ships the coins to the U.S. Federal Reserve Branch ("FRB") Office. The FRB, acting as "supplier," ships the coins to banks in response to orders that the FRB receives from the banks. The FRB may accept deposits of coins from the banks. The banks, acting as "distributors," distribute the coins to consumers or "end-users." The end users demand that the banks provide enough coins to meet the end users' requirements.

Many banks and FRB Offices are holding excess coins in inventory and excess coin value on their balance sheets. In some instances, banks do not have the capacity to store the coins or the demand to justify the inventory.

Coin aggregators recapture coins from consumers. The coin aggregators create a market by allowing consumers to convert idle coins into cash value. The coin aggregators process the coins into usable product and deposit the coins with banks for credit.

When the coin aggregators deposit the coins with banks, the coin aggregators increase pressure on banks to store the coins. As the coin aggregators become more successful at collecting used coins, the pressure on banks to store the coins increases.

There is a large number of unused coins in circulation. It is estimated also that approximately $10-15 B worth of coins are idle and unusable in the U.S. It is further estimated that a typical U.S. household holds $90 of idle coin.

$2.5 B coins (40 B pieces) were processed by a single coin aggregator in 2007. There is a single coin aggregator that recycles more coins than the U.S. Mint produces annually. 62% of idle coins captured by a particular aggregator are pennies, which are the most difficult coin for which to find storage.

Despite the storage of unused coins by the banks, the U.S. mint may continue to produce new coins on a fixed schedule. The production of new coins is expensive. The cost to produce a U.S. Penny is $0.017. For a U.S. Nickel, the cost is $0.075. It is estimated that for 2007, these costs contributed to a loss by the U.S. Treasury of about $100 MM. The production of new coins, and the storage and redistribution of unnecessarily introduced coins consumes natural resources.

The U.S. Mint will ship to any FRB or FRB Depot. Neither the Mint nor the FRB will transport private coin inventory to meet a coin demand. For example, if a first private institution has excess coins and a second private institution has a coin deficit, neither the Mint nor the FRB will transport coins from the first private institution to the second private institution to meet the needs of the first and second private institutions.

It would be desirable, therefore, to provide apparatus and methods for reducing the amount of coins that a bank is required to store.

It also would be desirable, therefore, to provide apparatus and methods to reduce losses associated with minting new coins.

It also would be desirable, therefore, to provide apparatus and methods to reduce the number of unused and/or idle coins.

SUMMARY OF THE INVENTION

It is an object of this invention to provide apparatus and methods for reducing the amount of coins that a bank is required to store.

It is another object of this invention to provide apparatus and methods to reduce losses associated with minting new coins.

It is yet another object of this invention to provide apparatus and methods to reduce the number of unused and/or idle coins.

Apparatus and methods for redistributing coins in a coin distribution system are therefore provided. The apparatus and methods may involve establishing a coin consortium. The consortium may be a privately owned and/or operated consortium. The consortium may include one or more banks, coin aggregators, commercial institutions and financial institutions. The consortium may receive excess coin inventory from one institution and distribute coins to another institution that requires the coins. For example, in some embodiments, the consortium may recapture coins from commercial institutions and distribute the coins to financial institutions. In some embodiments, the consortium may redistribute coins between financial institutions. In some embodiments, the consortium may redistribute coins between commercial institutions.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
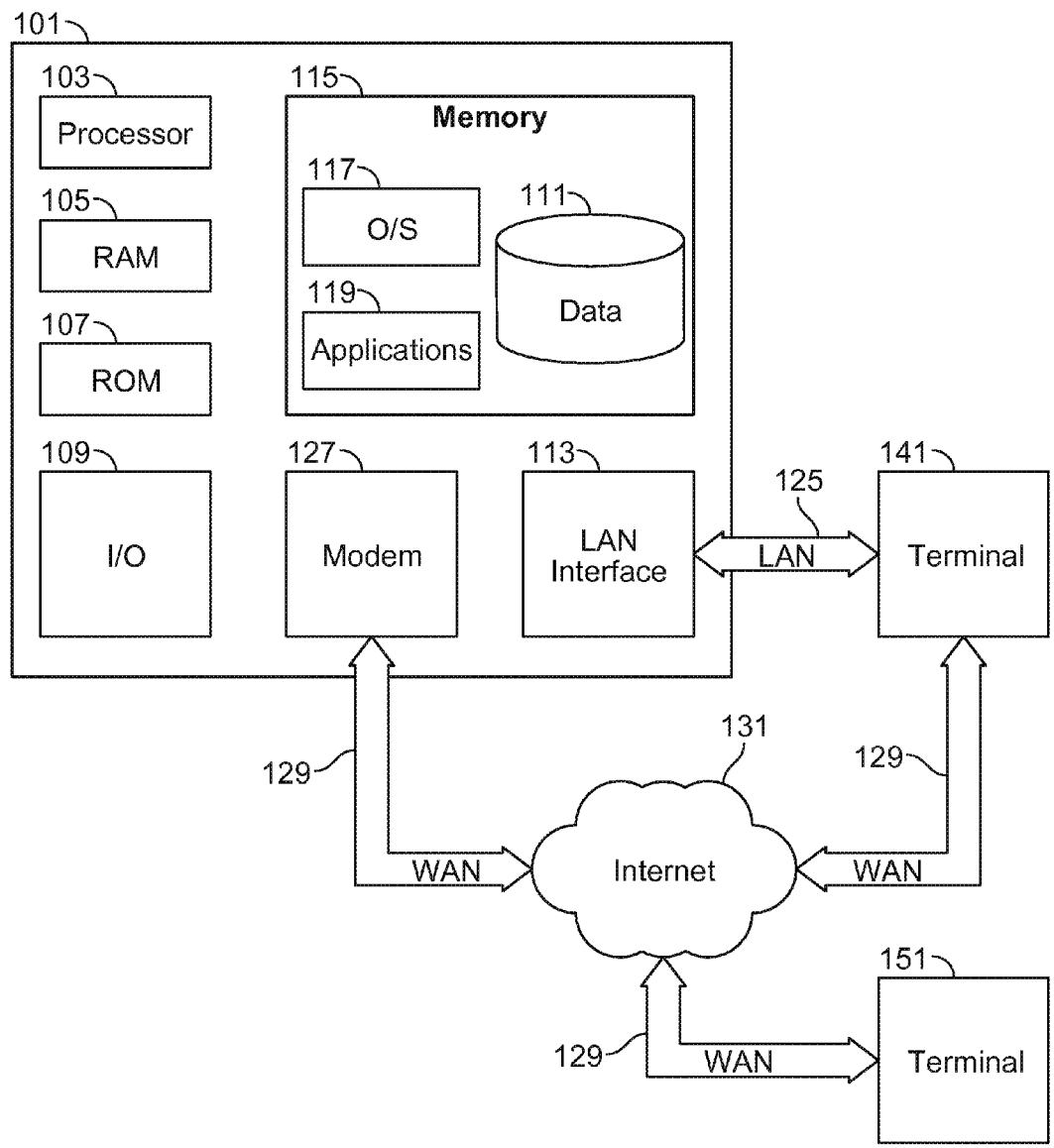
FIG. 1 shows a schematic diagram of apparatus that may be used in connection with the principles of the invention.

A coin consortium in accordance with the principles of the invention may combine U.S. coin producers, suppliers, aggregators, and distributors of U.S. coin into a cooperative network. In some embodiments, the network may operate as an extension of the Federal Reserve Branch system for ordering new and depositing excess coin. In some embodiments, the network may operate as an alternative to the Federal Reserve Branch system. The consortium may promote the continued re-capture of idle coins already in circulation, and provide a cost efficient means to re-circulate usable coins across distributors of coin to meet usage demand, while lowering the demand and cost to mint new coins by the U.S. Treasury.

A private sector coin consortium allows the combination of producers, suppliers, aggregators, and distributors to function in an efficient supply-chain. The consortium may thus lower the cost of coin while meeting the demand of coin in the economy. As one example, the consortium may incorporate the FRB's demand for coin orders with Private Sector Coin Inventory to supply the demand, or banks can place orders directly with the consortium and eliminate the need to use FRB supply to meet demand.

The consortium may support a "green" charter to reduce the resources required to produce new coins by reclaiming usable coins that are "trapped" in the economy, and lower fuel demands by reducing the movement of coin shipments between parties.

The consortium may promote the re-capturing of idle coin, employ an efficient model for processing and recirculating existing coins, and lower the demand to produce new coin. The consortium may incorporate the FRB's demand for coin orders with consortium inventory to supply the demand.

The consortium may receive from consortium members requests to meet coin requirements and/or requests to supply surplus coin. The consortium may match requirement requests and supply requests of the consortium members. The consortium may formulate and/or propose coin shipment amounts to meet the requirement requests and supply requests. The consortium may use the coin shipment amounts to direct transfers of the coins between the consortium members. Members may thus receive and supply coins depending on the members' inventory needs. In some instances, a member may require coins. In other instances, the member may supply coins. As such, coin flow among consortium members may be "bidirectional."

The consortium may maintain a coin inventory to hold coins for subsequent supply in response to requirement requests.

A consortium member may receive coin distribution services from the consortium in exchange for a membership fee.

In some embodiments of the invention, a non-member may pay a service fee for coin distribution services. Such services may include receiving from the non-members surplus coins, providing to the non-member required coins and the like. The service fee may be owned by the consortium. The service fee may be distributed to one or more of the members. The distribution of the service fee to the members may be based on the extent of the members' participation in coin distribution within the consortium.

In some embodiments, the consortium may provide transaction settlement functions to members. For example, the members may maintain an account with the consortium. When the consortium transfers coins from a first member to a second member, the consortium may, in order to provide payment for the coins, transfer funds from the second member's account to the first member's account.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 125.

Input/output ("I/O") module 109 may include a microphone, keypad, touch screen, and/or other means through which a user of device 101 may provide input, and may also include one or more of a speaker for providing audio output and a video display device for providing textual, audiovisual and/or graphical output. Software may be stored within memory 125 and/or storage to provide instructions to processor 103 for enabling server 101 to perform various functions. For example, memory 125 may store software used by server 101, such as an operating system 117, application programs 119, and an associated database 121. Alternatively, some or all of server 201 computer executable instructions may be embodied in hardware or firmware (not shown). As described in detail below, database 121 may provide storage for account information, account holder information, account application data and statistics, and any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

A financial institution may use a terminal such as 141 or 151 to communicate with a customer about an application for a credit card account. Customer attribute information, including credit application information, may be stored in memory 125. The attribute information may be processed by an application such as one of applications 119.

One or more of applications 119 may include an algorithm that may be used to determine the quantity of coins that should be shipped between a first institution and a second institution in order to adjust a coin inventory imbalance.

Apparatus and methods in accordance with the principles of the invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
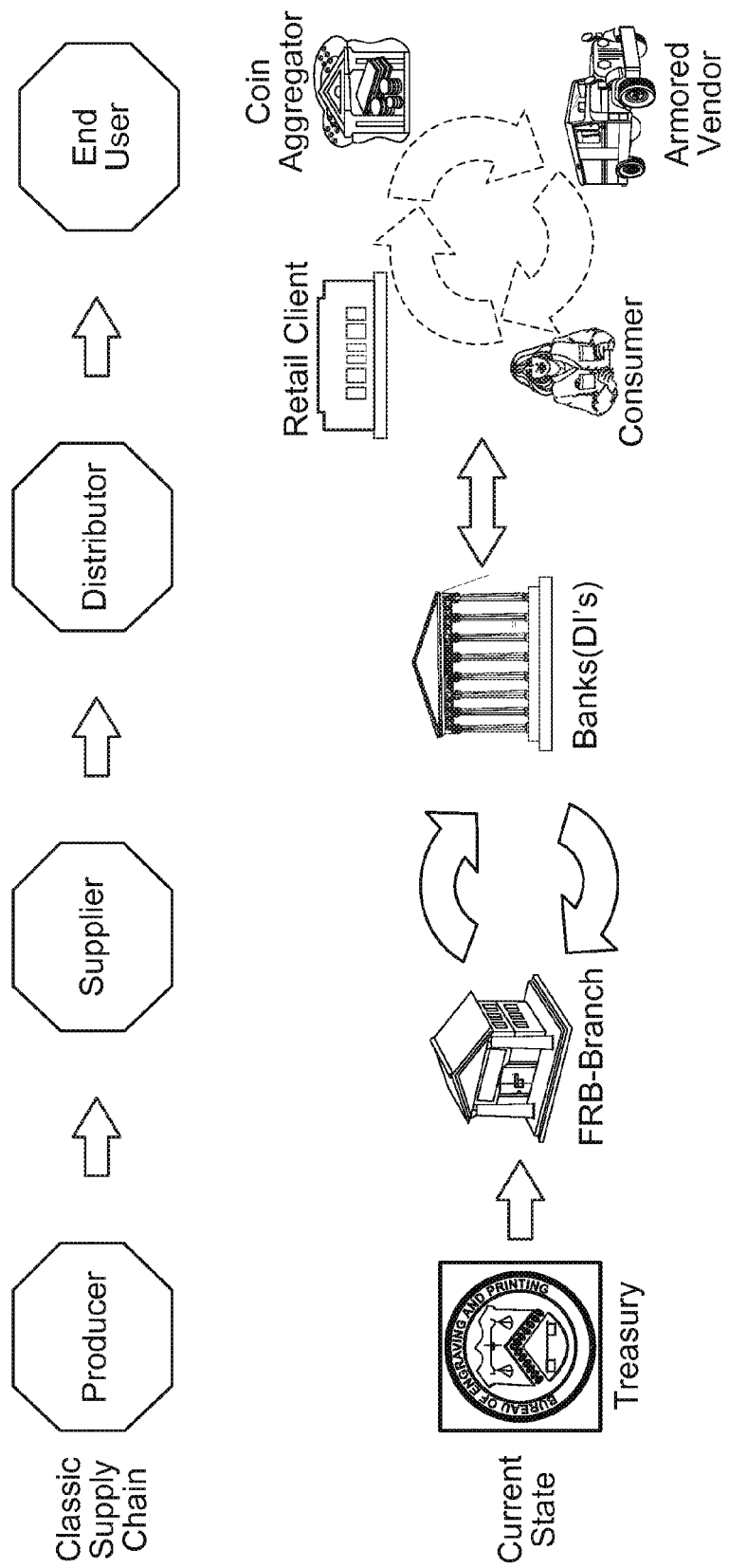
FIG. 2 shows a classic supply chain and the current coin distribution supply chain.

FIG. 2 shows a classic supply chain that involves a producer, a supplier, a distributor and an end user. FIG. 2 also shows how, in the current state of coin distribution in the U.S., the U.S. Treasury, FRB and banks correspond, respectively to the producer, supplier and distributors. The distributors distribute coins to consumers and retail clients. Coin aggregators collect unused coins and ship them back to banks by armored carrier. The FRB may not accept coins from the banks. The banks must then maintain excess coin inventory.

Figure 3:
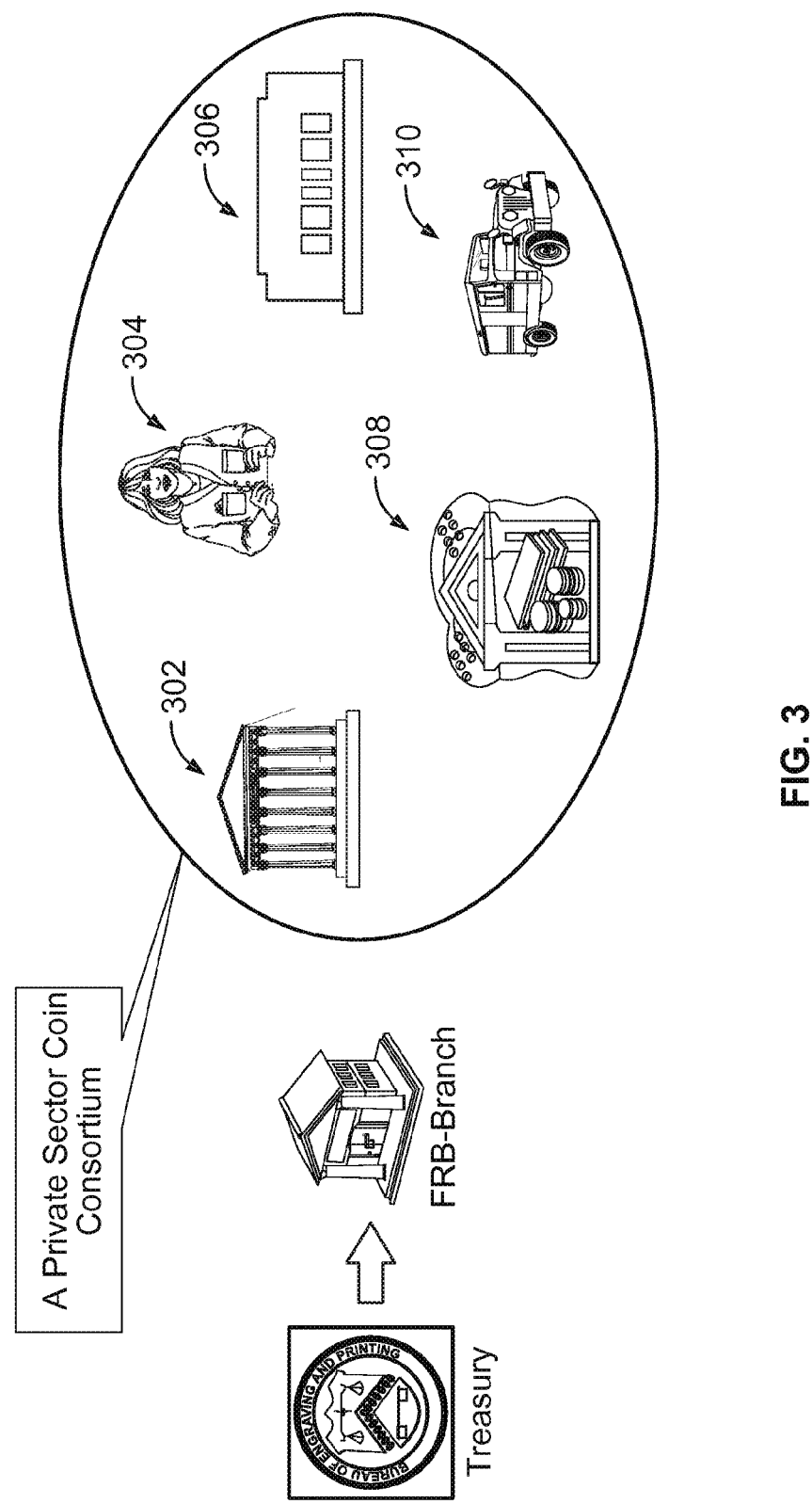
FIG. 3 shows a coin supply chain in accordance with the principles of the invention.

FIG. 3 shows an illustrative coin distribution process in accordance with the principles of the invention. The Treasury and FRB correspond to producer and supplier, respectively. After passing through the FRB, coins are distributed between financial institutions, commercial institutions, consumers, shippers and aggregators by a coin consortium. In some embodiments, the coins may be distributed by and between one or more of financial institution 302, consumer 304, commercial institution (such as a retailer) 306, aggregator 308 and armored carrier 310. One or more of the financial institutions, commercial institutions, consumers, shippers and aggregators may be a member of the consortium. The members of the consortium may cooperate to distribute coins among the members. The consortium may be privately owned and/or operated.

The consortium may distribute coins based on any suitable factors, such as the requirements of the institutions or other entities. Consortium may distribute coins based on the rate of production of new coins by the Treasury. The consortium may distribute coins based on the distribution of coins by the FRB.

Figure 4:
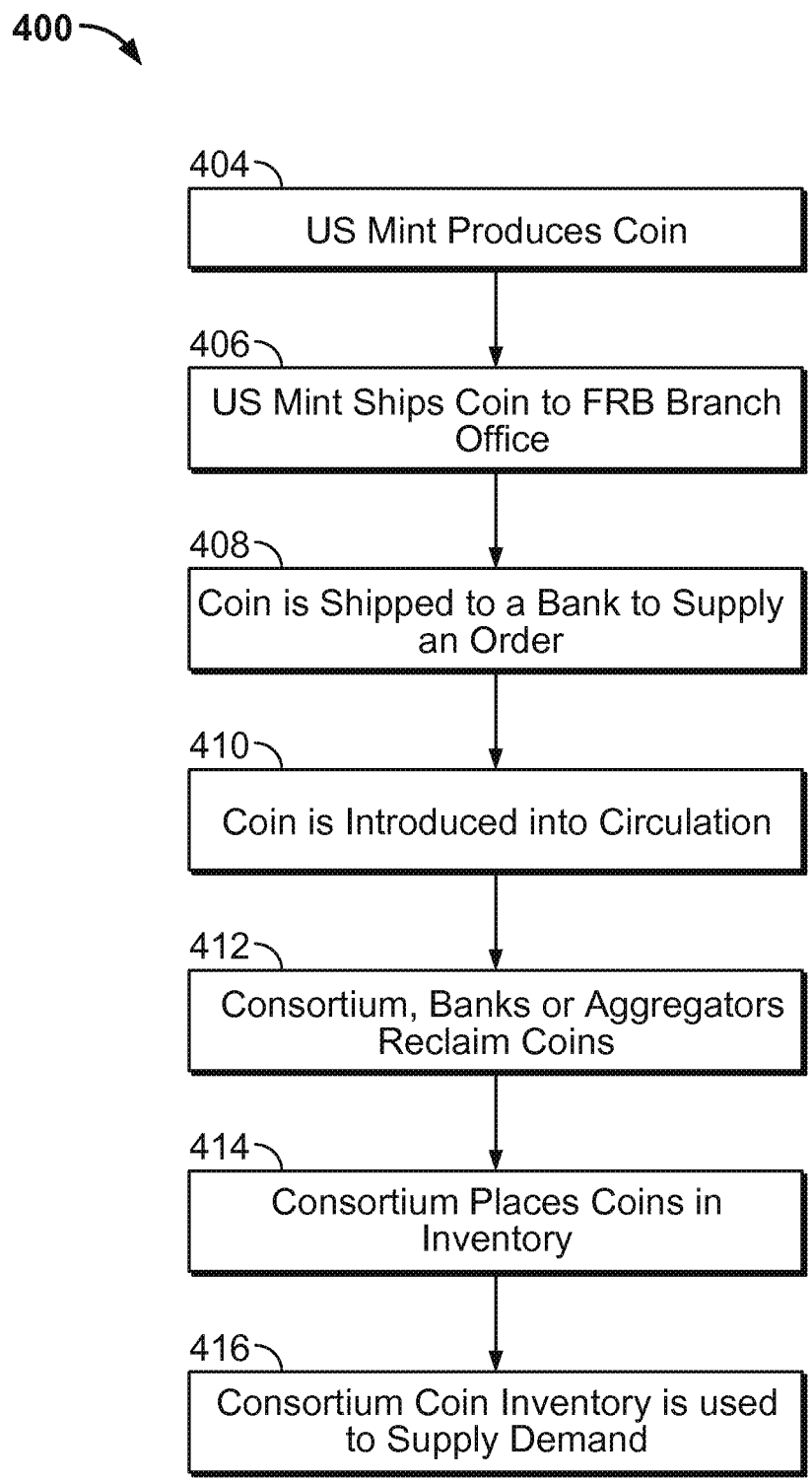
FIG. 4 shows a flow chart of an illustrative process in accordance with the principles of the invention.
Figure 5:
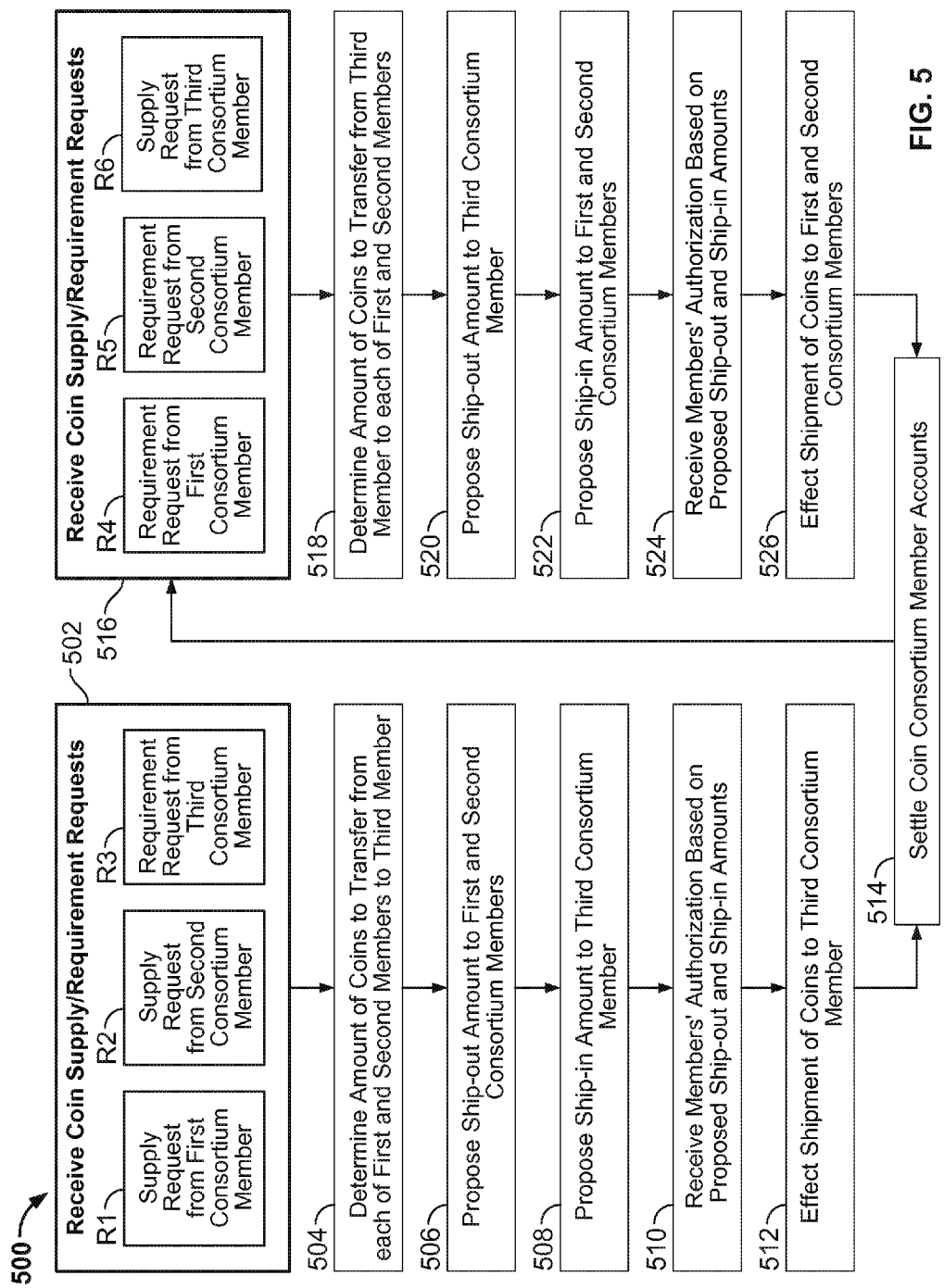
FIG. 5 shows a flow chart of another illustrative process in accordance with the principles of the invention.

FIGS. 4 and 5 show illustrative process steps for collecting, storing and distributing coins. For the sake of illustration, the steps may be described as being performed by a coin consortium. The consortium may involve one or more of the devices, individuals and entities shown in FIGS. 1 and 3 and/or any other suitable device or approach.

FIG. 4 shows illustrative process 400. Process 400 may start at step 404. At step 404, the U.S. Mint produces coins. At step 406, the U.S. Mint ships the coins to a Federal Reserve Branch office. At step 408, coins are shipped to a bank to supply an order. At step 410, the coins are introduced into circulation when the bank provides coins to a customer. At step 412, consortium banks and/or aggregators reclaim coins. The coins may be reclaimed from consortium members. The coins may be reclaimed from non-members.

Non-members may include financial, commercial (e.g., retail businesses), armored carriers and governmental entities or institutions. A non-member may be required to pay a service fee to the consortium for receipt by the consortium of the non-member's surplus coins.

At step 414, the consortium may place some or all of the coins in inventory. In some embodiments, the inventory may be a central inventory. The central inventory may be housed at a facility of a consortium member. In some embodiments, the inventory may be a distributed inventory. Some or all of the distributed inventory may housed at one or more facilities of one or more consortium members.

At step 416, the consortium may distribute coin inventory to meet existing demand for coins. The consortium may provide coins to one or more consortium members. The consortium may provide coins to one or more non-members.

FIG. 5 shows illustrative process 500 for distributing coins. The process may begin at step 502. At step 502, the consortium may receive requests such as R1, R2 and R3. R1 is a supply request from a first consortium member. R1 requests that the consortium accept coins from the first consortium member. R1 may be issued by the first consortium member to the consortium to adjust the coin inventory of the first consortium member. R2 is a supply request from a second consortium member. R2 requests that the consortium accept coins from the second consortium member. R2 may be issued by the second consortium member to the consortium to adjust the coin inventory of the second consortium member. R3 is a requirement request from a third consortium member. R3 requests that the consortium provide coins to the third consortium member. R3 may be issued by the third consortium member to the consortium to adjust the coin inventory of the third consortium member.

In some embodiments, step 502 may involve receiving requests to exchange coins with a non-member. The non-member may be required to pay a service fee in connection with a supply request or a requirement request.

At step 504, the consortium may determine an amount of coins to transfer from each of the first and second members to the third member. In embodiments in which the consortium maintains a coin inventory, some or all of R3 may be satisfied with coins from the inventory. If supply requests R1 and R2 exceed requirement request R3, the consortium may receive surplus coins corresponding to R1 and R2 and place the coins in the inventory. In processes such as 500, the "amounts of coins" may be expressed in terms of number of coins, value of coins or value of coins of a selected denomination.

At steps 506 and 508, the consortium may propose one or more coin transfers between the first member, the second member, the third member and inventory. The transfers may include ship-outs from one or both of the first and second members and a ship-in to the third member. The proposed transfers may include a ship-in or a ship-out of inventory coins.

At step 510, the consortium may receive from one or more of the first, second and third members authorization to execute the transfers. At step 512, the consortium may ship, or effect shipment of, the coins.

At step 514, the consortium may settle accounts of the first, second and third members based on the transfers executed in step 512.

The consortium may facilitate bidirectional exchange between institutions. In bidirectional exchange, an institution may be a coin recipient with respect to one coin transfer and a coin supplier with respect to another transfer. The two transfers may happen at different times. Therefore, an institution that supplies coins for a transfer may, at a later time, become a recipient of coins for a transfer. In some instances, coins may first be transferred from "institution A" to "institution B" and then, later, coins may be transferred from "institution B" to "institution A."

Bidirectional exchange in process 500 may be understood by comparing step 502 to step 516. In step 502, the first and second members present supply requests R1 and R2, respectively, which ask to supply coins. The third member presents requirement request R3. Thus, coins might flow from one or both of the first and second members to the third member. Step 516 illustrates that the first and second members may present requests R4 and R5, which are requirement requests-asking to receive coins. The third member presents R6, which is a supply request. Thus, in connection with the requests of step 502, coins are transferred to the third member and in connection with the requests of step 516, coins are transferred away from the third member. Steps 518, 520, 522, 524 and 526 are analogous to steps 504, 506, 508, 510 and 512, but show the transfer of coins away from the third member.

In embodiments in which the consortium maintains a coin inventory, exchange of coins with the inventory may be involved in a manner similar to that in which exchange of coins with the inventory may be involved in steps 504, 506, 508, 510 and 512.

One of ordinary skill in the art will appreciate that the steps may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Aspects of the invention have been described in terms of illustrative embodiments thereof. A person having ordinary skill in the art will appreciate that numerous additional embodiments, modifications, and variations may exist that remain within the scope and spirit of the appended claims.

Thus, systems and methods for distributing coins in a coin distribution system have been provided. Persons skilled in the art will appreciate that the present invention can be practiced by other than the described embodiments, which are presented for purposes of illustration. The present invention is limited only by the claims which follow.

What is claimed is:

1. A non-transitory computer-readable medium storing computer-executable instructions which, when executed by a processor on a computer system, perform a method for distributing coins in a coin distribution system, the method comprising:

a coin consortium receiving a first request to adjust a first coin inventory at a first institution;

the coin consortium receiving a second request to adjust a second coin inventory at a second institution;

the coin consortium, in response to receiving the second request:

adjusting the second coin inventory by initiating a transfer of a first penny from a U.S. Federal Reserve Branch to the second institution; and maintaining a second penny in the first coin inventory, thereby imposing a storage cost on the first institution;

the coin consortium receiving a third request to adjust the second coin inventory at the second institution; and the coin consortium, in response to receiving the third request, reducing the storage cost by:

bypassing the U.S. Federal Reserve Branch; and initiating a transfer of the second penny from the first institution to the second institution;

wherein neither the first institution nor the second institution is the U.S. Federal Reserve Branch.

2. The medium of claim 1 the method further comprising the coin consortium electronically executing an order to ship coins from the second institution to the first institution.

3. The medium of claim 2 the method further comprising:

the coin consortium collecting a coin consortium membership fee from the first institution and the second institution; and in exchange for the fees, the coin consortium conferring consortium membership status to the first institution and the second institution.

4. The medium of claim 3 the method further comprising the coin consortium providing a coin supply service to a third institution, the third institution not having consortium membership status.

5. The medium of claim 4 the method further comprising, when the coin supply service comprises providing coins from a member of the consortium to the third institution, the coin consortium collecting a service fee from the third institution in exchange for providing the coin supply service.

6. The medium of claim 5 the method further comprising the coin consortium distributing a portion of the service fee to the member of the consortium.

7. The medium of claim 5 the method further comprising the coin consortium distributing a portion of the service fee to a different member of the consortium.

8. A non-transitory computer-readable medium storing computer-executable instructions which, when executed by a processor on a computer system perform a method for distributing coins among members of a coin consortium, the computer-executable instructions comprising:

computer-executable instructions for causing the computer system to receive a first order for the coin consortium to ship coins from a first coin consortium member to a second coin consortium member, the first order based on a first requirement to adjust a first coin inventory of the first consortium member and a second coin inventory of the second consortium member, respectively; and computer-executable instructions for causing the computer system to receive a second order for the coin consortium to ship coins from the second coin consortium member to the first coin consortium member, the second order based on a second requirement to adjust the first and second coin inventories;

computer-executable instructions for causing the computer system, in response to receiving the first order, to transmit a first coin shipment directive from the coin consortium, the first coin shipment directive comprising:

a first transfer of coins from the first consortium member to the second consortium member, thereby reducing a coin storage cost of the first consortium member; and a bypass of a U.S. Federal Reserve Branch, thereby imposing a coin storage cost on the U.S. Federal Reserve Branch;

computer-executable instructions for causing the computer to transmit, in response to receiving the second order, a second coin shipment directive from the coin consortium, the second coin shipment directive comprising:

a second transfer of coins from the second consortium member to the coin consortium, thereby reducing a coin storage cost of the second consortium member; and a third transfer of coins from the U.S. Federal Reserve Branch to the first consortium member;

wherein neither the first consortium member nor the second consortium member is the U.S. Federal Reserve Branch.

9. The medium of claim 8 further comprising computer-executable instructions for causing the computer system to:
provide a coin exchange settlement ledger; and
record in the ledger a value corresponding to coins shipped from the first coin consortium member to the second coin consortium member.

10. The medium of claim 9 further comprising computer-executable instructions for causing the computer system to transfer funds from the second coin consortium member to the first coin consortium member, the funds corresponding to the value of the coins.

11. The medium of claim 10 wherein the transferring comprises transferring the funds to a first coin consortium account from a second coin consortium account; wherein:
the first coin consortium account corresponds to the first coin consortium member;
the second coin consortium account corresponds to the second coin consortium member; and
the first and second coin consortium accounts are in the custody of the coin consortium.

12. The medium of claim 8 further comprising computer-executable instructions for causing the computer system to transmit, from the coin consortium, a coin shipment directive to an entity that is not a member of the coin consortium.

13. The medium of claim 12 further comprising computer-executable instructions for causing the computer system to receive a service fee from the entity in exchange for providing the coin shipment directive to the entity.

14. The medium of claim 13 further comprising computer-executable instructions for causing the computer system to distribute a first portion of the service fee to the first coin consortium member and a second portion of the service fee to the second consortium member.

15. The medium of claim 14 further comprising computer-executable instructions for causing the computer system to distribute a third portion of the service fee to a third member of the coin consortium.

16. A non-transitory computer-readable medium storing computer-executable instructions which, when executed by a processor on a computer system, perform a method for a coin consortium to distribute distributing coins among members of the coin consortium, the method comprising:
receiving a coin supply request from a first member of the coin consortium;
receiving a coin requirement request from a second member of the coin consortium; and
in response to receiving the requirement request and the supply request, adjusting a second coin inventory at the second member of the coin consortium and a first coin inventory at the first member of the coin consortium by:
transferring a first number of coins from the first member of the coin consortium to the second member of the coin consortium, thereby reducing a storage cost of the first number of coins imposed on the first member of the coin consortium;
maintaining a second amount of coins at a U.S. Federal Reserve Branch, thereby imposing a storage cost of the second amount of coins on the U.S. Federal Reserve Branch; and
bypassing the U.S. Federal Reserve Branch;
wherein neither the first institution member nor the second institution member is the U.S. Federal Reserve Branch.

* * * * *